(12) United States Patent
Matsuo et al.

(10) Patent No.: US 11,443,533 B2
(45) Date of Patent: Sep. 13, 2022

(54) INFORMATION PROCESSING APPARATUS AND COMPUTER READABLE STORAGE MEDIUM

(71) Applicant: HONDA MOTOR CO., LTD., Tokyo (JP)

(72) Inventors: Yoshikazu Matsuo, Saitama (JP); Hisumi Esaki, Saitama (JP); Yusuke Oi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 354 days.

(21) Appl. No.: 16/724,362

(22) Filed: Dec. 22, 2019

(65) Prior Publication Data

US 2020/0210736 A1    Jul. 2, 2020

(30) Foreign Application Priority Data

Dec. 28, 2018    (JP) .............................. JP2018-246786

(51) Int. Cl.
| | |
|---|---|
| *G06K 9/00* | (2022.01) |
| *G06V 20/59* | (2022.01) |
| *G10L 15/22* | (2006.01) |
| *B60W 50/14* | (2020.01) |
| *G06V 40/16* | (2022.01) |

(52) U.S. Cl.
CPC .......... *G06V 20/597* (2022.01); *B60W 50/14* (2013.01); *G06V 40/174* (2022.01); *G10L 15/22* (2013.01)

(58) Field of Classification Search
CPC .... G06V 20/597; G06V 40/174; G06V 20/56; G06V 20/59; B60W 50/14; G10L 15/22; G10L 17/00; G10L 25/63

USPC ........................................... 382/118; 180/271
See application file for complete search history.

(56) References Cited

U.S. PATENT DOCUMENTS

| | | | |
|---|---|---|---|
| 2008/0105482 A1* | 5/2008 | Yamaguchi ............ | G05B 15/02 180/271 |
| 2018/0178807 A1 | 6/2018 | Murata | |
| 2019/0161088 A1* | 5/2019 | Goto .................... | G06V 40/176 |

FOREIGN PATENT DOCUMENTS

| | | |
|---|---|---|
| JP | 2002015322 A | 1/2002 |
| JP | 2013164664 A | 8/2013 |
| JP | 2018106530 A | 7/2018 |
| JP | 2018189720 A | 11/2018 |
| JP | 2020068973 A | 5/2020 |

OTHER PUBLICATIONS

Office Action issued for counterpart Japanese Application No. 2018-246786, issued by the Japanese Patent Office on Oct. 5, 2021 (drafted on Sep. 30, 2021).

* cited by examiner

*Primary Examiner* — Charlotte M Baker

(57) ABSTRACT

An information processing apparatus, comprising a determination unit configured to determine whether a vehicle is located inside a lower accuracy area, in which an estimation accuracy of the emotion estimation process lowers, wherein the emotion estimation process is a process for estimating an emotion of an occupant based on an image of the occupant of the vehicle captured by an image-capturing unit provided in the vehicle, and an emotion estimating unit configured to estimate the emotion of an occupant by performing different emotion estimation processes depending on whether the vehicle is located inside the lower accuracy area or not is provided.

15 Claims, 10 Drawing Sheets

INFORMATION PROCESSING APPARATUS AND COMPUTER READABLE STORAGE MEDIUM

The contents of the following Japanese patent application are incorporated herein by reference: 2018-246786 filed in JP on Dec. 28, 2018

BACKGROUND

1. Technical Field

The present invention relates to an information processing apparatus and a computer readable storage medium.

2. Related Art

Apparatuses for executing emotion estimation process to estimate an emotion of an occupant of a vehicle using a face image of the occupant has been known (see Patent document 1, for example).

PRIOR ART DOCUMENTS

Patent Documents

[Patent document 1] Japanese Patent Application Publication No. 2018-106530

SUMMARY

It is preferable to provide a technique to suppress lowering of estimation accuracy of an image-based emotion estimation process.

DESCRIPTION OF EXEMPLARY EMBODIMENTS

Hereinafter, the present invention will be described with reference to embodiments of the invention. However, the following embodiments should not to be construed as limiting the claimed invention. Also, all the combinations of the features described in the embodiments are not necessarily essential for means provided by aspects of the invention.

Figure 1:
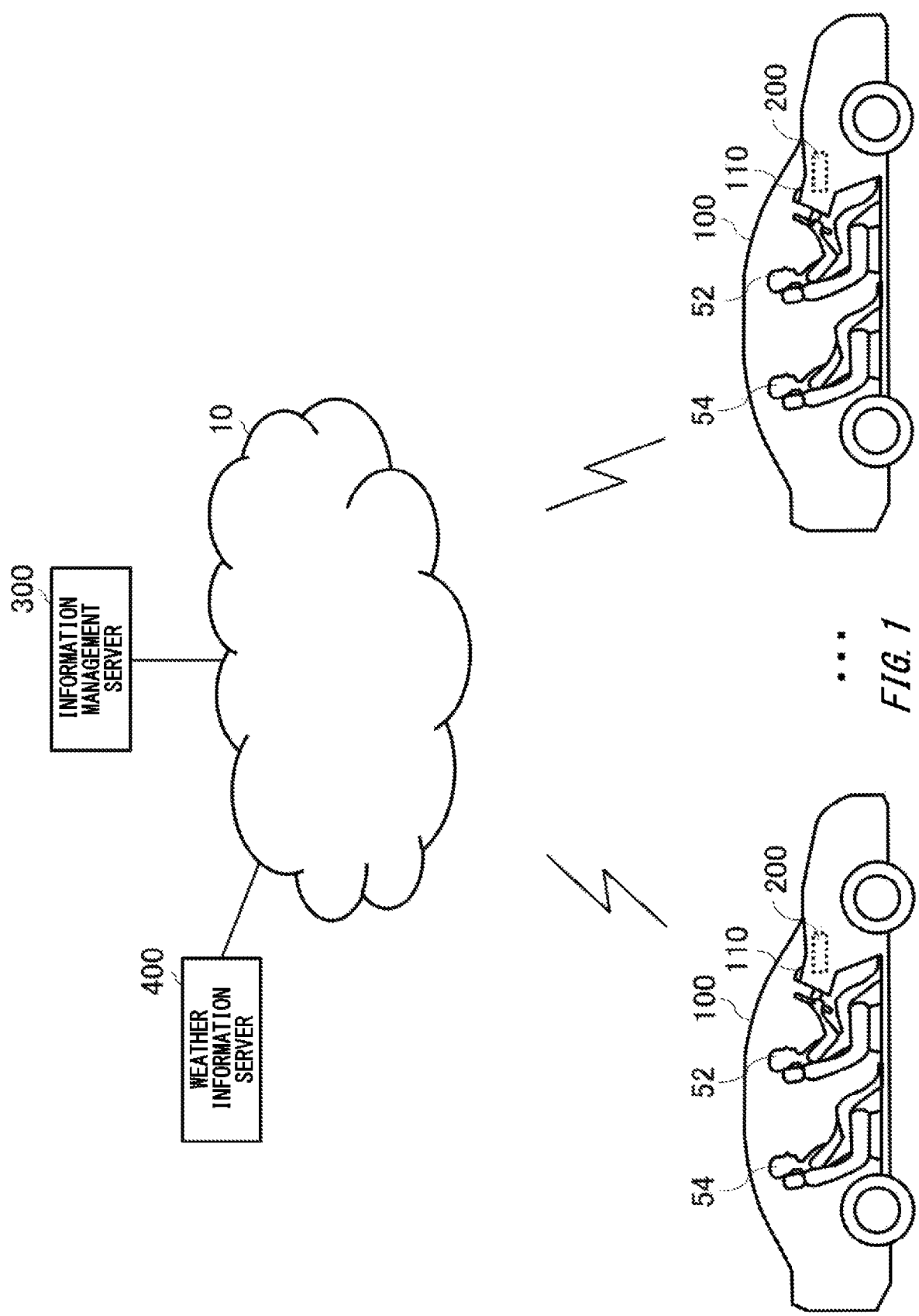
FIG. 1 schematically shows an example of a vehicle 100 according to the present embodiment.

FIG. 1 schematically shows an example of a vehicle 100 according to the present embodiment. The vehicle 100 includes an information processing apparatus 200. The information processing apparatus 200 has an emotion estimation processing function to estimate the emotion of an occupant of the vehicle 100.

The information processing apparatus 200 may be capable of performing emotion estimation process to estimate the emotion of an occupant using a face image of the occupant of the vehicle 100.

In the present embodiment, if persons in the vehicle 100 are not distinguished, the persons are referred to as occupants, and if a person who is driving and a person who is not driving are distinguished, the former is referred to as a driver 52 and the latter is referred to as a passenger 54. If the vehicle 100 is an automated driving vehicle, the driver 52 may be a person sitting on a driver's seat. The passenger 54 may be a person sitting on a front passenger seat. The passenger 54 may be a person sitting on a backseat.

The information processing apparatus 200 acquires an image of the occupant captured by an image-capturing unit included in the vehicle 100. The image-capturing unit may have one camera 110 capable of capturing images of the entire cabin of the vehicle 100. The information processing apparatus 200 may acquire an image of the driver 52 and an image of the passenger 54 from the camera 110.

The image-capturing unit may have a plurality of cameras 110. The information processing apparatus 200 may acquire, from the plurality of cameras 110, an image of the driver 52 and an image of the passenger 54 that are captured by respective ones of the plurality of cameras 110. For example, the image-capturing unit has a camera 110 capable of capturing images of the driver's seat and front passenger seat and a camera 110 capable of capturing images of the backseat. The image-capturing unit may have a camera 110 capable of capturing images of the driver's seat and a camera 110 capable of capturing images of the front passenger seat. The image-capturing unit may have a plurality of cameras 110 capable of capturing images of respective ones of a plurality of passengers 54 in the backseat.

For example, the information processing apparatus 200 pre-stores an image of the occupant with a neutral facial expression. The neutral facial expression may be a "plain" facial expression. For example, the plain facial expression of an occupant is a facial expression of the occupant when being conscious of nothing. The information processing apparatus 200 may estimate the emotion of the occupant by comparing a face image of the occupant captured by the camera 110 and the image of the occupant with the neutral facial expression.

For example, the information processing apparatus 200 stores the image of the occupant with the neutral facial expression captured by the camera 110 at initial settings. The information processing apparatus 200 may receive the image of the occupant with the neutral facial expression from another apparatus and store it. For example, the information processing apparatus 200 receives the image of the occupant with the neutral facial expression via short-range wireless communication, such as Bluetooth (registered trademark), from a mobile communication terminal, such as a smart phone, owned by the occupant. Also, for example, the information processing apparatus 200 receives the image of the occupant with the neutral facial expression via a mobile communication network or the like from a management server that manages the image of the occupant with the neutral facial expression.

The information processing apparatus 200 may estimate the emotion of the occupant by using a generic image of the neutral facial expression, rather than using the image of the occupant with the neutral facial expression. The generic image of the neutral facial expression may be an averaged image of the neutral facial expressions of a number of persons. The generic image of the neutral facial expression may be prepared for each attribute such as gender, age and race.

For example, the information processing apparatus 200 pre-stores association data in which the difference from the neutral facial expression is associated with a pattern of human emotions. For example, in the association data, a facial expression with lifted mouth corners relative to the neutral facial expression is associated with a positive emotion, and a facial expression with lowered mouth corners relative to the neutral facial expression is associated with a negative emotion. The information processing apparatus 200 identifies one of the pattern of emotions using the image of the occupant captured by the camera 110, the image with the neutral facial expression and the association data, to provide an estimation result of the emotion of the occupant.

For example, the pattern of human emotions adopted may be a pattern of emotions based on Russell's circumplex model, which expresses human emotions on two axes of "Arousal" and "Valence" and expresses emotion degrees by the distance from the origin. Also, for example, the pattern of emotions adopted may be that based on Plutchik's wheel of emotions, which classifies human emotions into eight basic emotions (joy, trust, fear, surprise, sadness, disgust, anger and anticipation) and advanced emotions each combining two adjacent emotions. Any pattern of emotions may be adopted for the information processing apparatus 200 according to the present embodiment, without being limited to these.

The information processing apparatus 200 may also estimate the emotion of the occupant by, instead of using the image with the neutral facial expression, storing a plurality of face images of the occupant when having respective types of emotions and thereafter comparing face images of the occupant captured by the camera 110 with the stored face images. For example, the information processing apparatus 200 identifies the face image that is the most similar of the stored face images to the face image of the occupant captured by the camera 110 and provides an emotion corresponding to the identified face image as an estimation result of the emotion of the occupant.

The information processing apparatus 200 may estimate the emotion of the occupant based on changes in face images of the occupant or the like, instead of using pre-stored images. There are various known techniques for estimating the emotion of a person from a face image of the person, and any of the various techniques may be adopted.

In the case of estimating the emotion of the occupant using the face image of the occupant, the accuracy of the emotion estimation process may lower depending on the situation of the occupant. For example, when the vehicle 100 drives in an area where the occupant is exposed to intense sunlight, then the estimation accuracy may lower compared to an area where the occupant is not exposed to intense sunlight due to flared highlights or strong shadows in the image of the occupant.

For example, the estimation accuracy may also lower when the occupant is exposed to headlights of oncoming vehicles and the like or when the vehicle 100 drives close to an illuminated place with lights of various colors flashing in various patterns.

For example, lowering in the estimation accuracy of the emotion estimation process means decrease in the accuracy rate of the estimation result. That is, the ratio of the emotion estimation result matching with the actual emotion decreases. For example, there may be cases in which a facial expression of joy of the occupant feeling happy, is estimated to be an expression of joy in an area where intense sunlight does not reach the occupant and to be an expression of anger in an area where intense sunlight reaches the occupant and the like. For example, the processing time for identifying the facial expression may take longer for the face image of the occupant in an area where the occupant is exposed to intense sunlight than that in an area where the occupant is not exposed to intense sunlight due to the impact of the flared highlights, strong shadows, and the like and there may be cases in which the emotion estimation process by the information processing apparatus 200 is likely to take longer. The sunlight reaching area where the intense sunlight reaches the occupant is an example of an area in which the accuracy of the emotion estimation process for estimating the emotion of the occupant using the face image of the occupant lowers (it is referred to as lower accuracy area in some cases). Note that the lowering of the accuracy of the emotion estimation process includes cases where the emotion estimation process cannot be performed due to the images unsatisfying the conditions for performing the emotion estimation process.

The information processing apparatus 200 according to the present embodiment estimates the emotion of the occupant by performing different emotion estimation processes depending on whether the vehicle 100 is located inside the lower accuracy area or not. For example, the information processing apparatus 200 performs the emotion estimation process using the image of the occupant outside the lower accuracy area, but performs the emotion estimation process using information about the occupant other than the image inside the lower accuracy area. For example, the information processing apparatus 200 performs the emotion estimation process based on a voice of the occupant and biological information of the occupant such as heartbeat, pulse rate, sweating, blood pressure, body temperature, and the like without using the image of the occupant inside the lower accuracy area. Thus, the emotion estimation process in the area where the accuracy of the image-based emotion estimation process lowers, the lowering of the estimation accuracy may be suppressed by using information other than images in the emotion estimation process. In addition, the longer time required for the emotion estimation process may be suppressed by eliminating the time needed for specially processing the flared highlights and strong shadows in the images.

The information processing apparatus 200 determines whether the vehicle 100 is located inside the lower accuracy area by at least one of various methods. For example, the information processing apparatus 200 pre-stores lower accuracy area information indicating the lower accuracy area. The information processing apparatus 200 then acquires position information of the vehicle 100 and determines whether the position indicated by the position information is inside the lower accuracy area.

For example, the information processing apparatus 200 receives the lower accuracy area information from the information management server 300 via the network 10, and stores it. The network 10 may be any network. The network 10 may include, for example, mobile communication systems such as a 3G (Third Generation) communication system, LTE (Long Term Evolution) communication system and 5G (Fifth Generation) communication system. The network 10 may include the Internet, a public wireless LAN (Local Area Network), any dedicated network, and the like.

The information management server 300 generates and stores the lower accuracy area information and transmits the lower accuracy area information to the information processing apparatus 200. For example, the information management server 300 generates the lower accuracy area information, indicating the position of the lower accuracy area for each time period based on a three-dimensional map illustrating roads, buildings, and the like for each location and the position of the sun for each date and time.

The information management server 300 may generate the lower accuracy area information using information collected from a plurality of vehicles 100. For example, the information management server 300 receives position information and date-and-time information indicating the position and date and time at which the sunlight reaches the occupant from each of the plurality of vehicles 100, and generates the lower accuracy area information using the received information. For example, each of the plurality of vehicles 100 determines whether the sunlight reaches the occupant while driving and, when determining as reaching, transmits position information and date-and-time information to the information management server 300.

The information management server 300 may collect information from a plurality of vehicles 100 each having a dedicated function to determine whether the sunlight reaches the occupant. For example, the plurality of vehicles 100 each include a light sensor which detects the intensity of light reaching the occupant.

The information management server 300 may collect information from a plurality of vehicles 100 that have no dedicated functions to determine whether the sunlight reaches the occupant. For example, the plurality of vehicles 100 each analyzes the face image of the occupant and transmits the position information and the date information to the information management server 300 when determining that the sunlight reaches the occupant. The determination of whether the sunlight reaches the occupant obtained by analyzing the face image may have low accuracy, but the information management server 300 can compensate the low accuracy by collecting a large amount of information. Note that the vehicle 100 may continuously transmit the face image of the occupant, the position information and the date-and-time information to the information management server 300 and the information management server 300 may analyze the face image of the occupant to determine whether the sunlight reaches the occupant.

The information management server 300 may collect information from a plurality of vehicles 100 that drive for a test for deriving the accuracy of the emotion estimation process using the face image of the occupant. The plurality of vehicles 100 may each transmit the accuracy of the emotion estimation process using the face image of the occupant, the position information and the date-and-time information to the information management server 300. For example, in the vehicle 100, the occupant inputs his/her own emotion as appropriate. The vehicle 100 may derive the estimation accuracy by comparing the emotion that is input by the occupant and the emotion of the occupant that is estimated using the face image of the occupant.

The information processing apparatus 200 may determine whether the vehicle 100 is located inside the lower accuracy area using the position information of the vehicle 100, the date-and-time information and the data of the three-dimensional map in the vicinity of the vehicle 100, instead of using the lower accuracy area information. For example, the information processing apparatus 200 determines whether the vehicle 100 is located inside the lower accuracy area by identifying the relative position of the vehicle 100 to the sun based on the position information and the date-and-time information and identifying if there is a building or the like that blocks the sunlight between the vehicle 100 and the sun.

When the vehicle 100 is determined to be located inside the sunlight reaching area but determined to be in a situation that the sunlight does not reach the occupant, the information processing apparatus 200 may control the emotion estimation process to be performed in the same way as if the vehicle 100 was located outside the sunlight reaching area.

For example, the situation that the sunlight does not reach the occupant is a situation that the weather at the position of the vehicle 100 is not sunny. For example, the information processing apparatus 200 may determine the weather at the position of the vehicle 100 by receiving weather information from a weather information server 400, providing weather information, via the network 10. Also, if the vehicle 100 includes a weather sensor, the information processing apparatus 200 may determine the weather at the position of the vehicle 100 by acquiring weather information detected by the weather sensor. For example, the weather sensor is constituted of a humidity sensor, an atmospheric pressure sensor, an illuminance sensor, a camera, and the like.

In addition, the situation that the sunlight does not reach the occupant of the vehicle 100 is a situation that measures are taken that the sunlight does not reach the occupant. A specific example is a situation that a sun visor is used in the vehicle 100. If the vehicle 100 includes a sensor for detecting the usage of the sun visor, the information processing apparatus 200 may determine whether the sun visor is used based on information received from the sensor.

Figure 2:
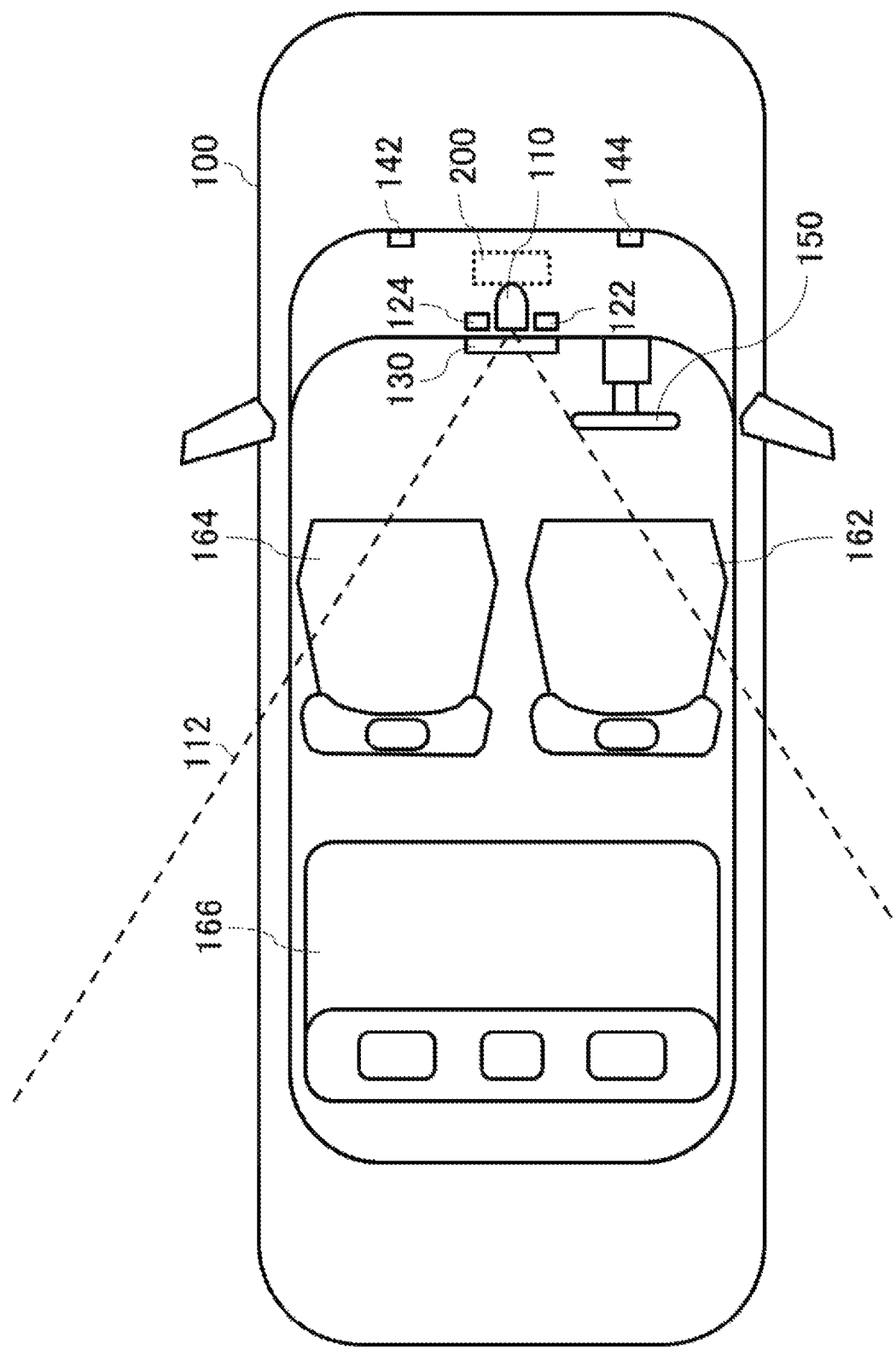
FIG. 2 schematically shows an example of configuration of the vehicle 100.

FIG. 2 schematically shows an example of configuration of the vehicle 100. The components shown in FIG. 2 may be a part of a navigation system included in the vehicle 100.

The vehicle 100 includes a camera 110. In the example of FIG. 2, the vehicle 100 includes the camera 110 that is capable of capturing images of all of the driver's seat 162, front passenger seat 164 and backseat 166. As indicated by an angle of view 112 shown in FIG. 2, the camera 110 is capable of capturing images of the occupants of the driver's seat 162, front passenger seat 164 and backseat 166. The arrangement of the camera 110 in FIG. 2 is an example, and the camera 110 may be arranged at any position as long as it can capture images of all of the driver's seat 162, front passenger seat 164 and backseat 166. Note that the vehicle 100 may include a plurality of cameras 110 for capturing respective ones of the driver's seat 162, front passenger seat 164 and backseat 166.

The vehicle 100 may include a microphone 122. FIG. 2 shows an example in which the vehicle 100 includes a microphone 122 that supports all of the driver's seat 162, front passenger seat 164 and backseat 166. The arrangement of the microphone 122 in FIG. 2 is an example, and the microphone 122 may be arranged at any position as long as it can pick up the voices of all the occupants of the driver's seat 162, front passenger seat 164 and backseat 166. The vehicle 100 may include a plurality of microphones 122. For example, the plurality of microphones 122 include a microphone 122 for the driver's seat 162, a microphone 122 for the front passenger seat 164 and a microphone 122 for the backseat 166.

The vehicle 100 includes an audio speaker 124. FIG. 2 shows an example in which the vehicle 100 includes the audio speaker 124 that supports all of the driver's seat 162, front passenger seat 164 and backseat 166. The arrangement of the audio speaker 124 in FIG. 2 is an example, and the audio speaker 124 may be arranged at any position. The vehicle 100 may include a plurality of audio speakers 124.

The vehicle 100 includes a display 130. The arrangement of the display 130 in FIG. 2 is an example, and the display 130 may be arranged at any position as long as it can be viewed mainly from the driver's seat 162 and front passenger seat 164. The display 130 may be a touch screen display. The vehicle 100 may include a plurality of displays 130. For example, the vehicle 100 includes a display 130 for the driver's seat 162 and front passenger seat 164 and a display 130 for the backseat 166.

The vehicle 100 includes a wireless communication antenna 142. The wireless communication antenna 142 may be an antenna for performing communication with an apparatus on the network 10. For example, the vehicle 100 communicates with an apparatus on the network 10 by way of a wireless base station, wireless router, and the like in a mobile communication system by using the wireless communication antenna 142. Note that the wireless communication antenna 142 may be an antenna for performing vehicle-to-vehicle communication, vehicle-to-infrastructure communication, and the like, and the vehicle 100 may communicate with an apparatus on the network 10 through the vehicle-to-vehicle communication, vehicle-to-infrastructure communication, and the like.

The vehicle 100 includes a GPS (Global Positioning System) antenna 144. The GPS antenna 144 receives radio waves for position measurement from GPS satellites. The vehicle 100 may measure the current location of the vehicle 100 using the position-measurement radio waves received by the GPS antenna 144. The vehicle 100 may also use autonomous navigation in combination to measure the current location of the vehicle 100. The vehicle 100 may measure the current location of the vehicle 100 using any known position-measurement technique.

The vehicle 100 may include a sensor (not shown) capable of detecting biological information of the occupant of the vehicle 100. For example, the sensor is arranged at a steering wheel 150, the driver's seat 162, the front passenger seat 164, the backseat 166, or the like to detect biological information, such as heartbeat, pulse rate, sweating, blood pressure and body temperature, of the occupant. The vehicle 100 may include a short-range wireless communication unit communicatively connected to a wearable device worn by the occupant, and may receive, from the wearable device, biological information of the occupant detected by the wearable device. For example, the short-range wireless communication unit is communicatively connected to the wearable device via Bluetooth or the like.

The information processing apparatus 200 estimates the emotion of the occupant by using the information acquired by the above-mentioned components of the vehicle 100. The above-mentioned components may be included in the information processing apparatus 200. The information processing apparatus 200 may be integrated with or separated from a navigation system included in the vehicle 100.

Figure 3:
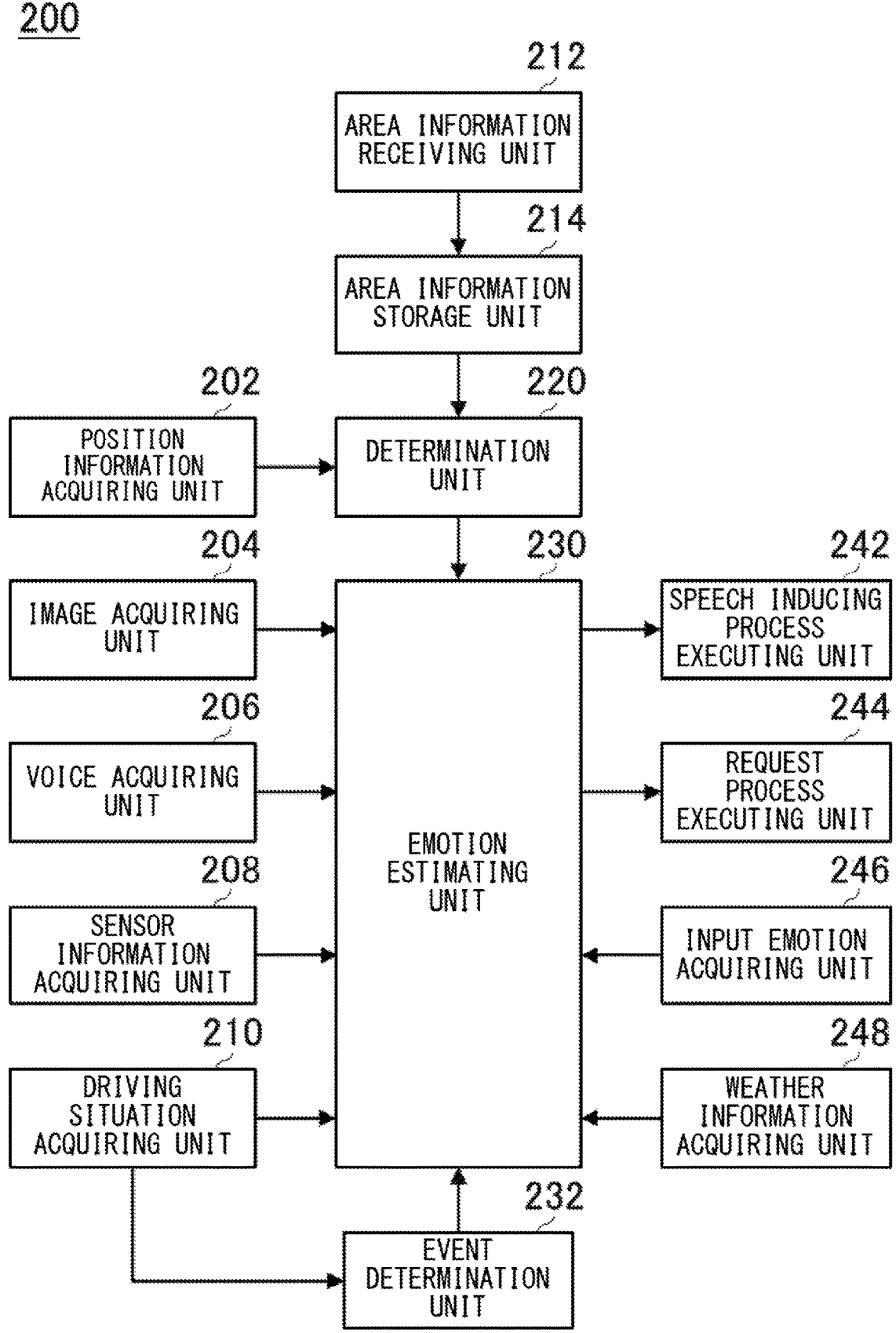
FIG. 3 schematically shows an example of functional configuration of an information processing apparatus 200.

FIG. 3 schematically shows an example of the functional configuration of the information processing apparatus 200. The information processing apparatus 200 includes a position information acquiring unit 202, an image acquiring unit 204, a voice acquiring unit 206, a sensor information acquiring unit 208, a driving situation acquiring unit 210, an area information receiving unit 212, an area information storage unit 214, a determination unit 220, an emotion estimating unit 230, an event determination unit 232, a speech inducing process executing unit 242, a request process executing unit 244, an input emotion acquiring unit 246 and a weather information acquiring unit 248. Note that the information processing apparatus 200 may not include all of these components.

The position information acquiring unit 202 acquires the position information of the vehicle 100. The position information acquiring unit 202 may acquire the position information of the vehicle 100 derived by using position measurement radio waves received by the GPS antenna 144. The position information of the vehicle 100 may be derived by the navigation system of the vehicle 100. In addition, the position information acquiring unit 202 may derive the position information using the information received by the GPS antenna 144.

The image acquiring unit 204 acquires an image of an occupant of the vehicle 100. The image acquiring unit 204 acquires an image of the occupant captured by the image-capturing unit of the vehicle 100. The image acquiring unit 204 may continuously acquire images of the occupant captured by the image-capturing unit of the vehicle 100.

The voice acquiring unit 206 acquires the voice of the occupant of the vehicle 100. The voice acquiring unit 206 acquires the voice of the occupant input from a microphone 122 in the vehicle 100. The voice acquiring unit 206 may continuously acquire the voice of the occupant from the microphone 122 in the vehicle 100.

The sensor information acquiring unit 208 acquires biological information of an occupant of the vehicle 100 detected by the sensor. For example, the sensor information acquiring unit 208 acquires, from a sensor arranged at the steering wheel 150, driver's seat 162, front passenger seat 164, backseat 166, or the like, biological information, such as heartbeat, pulse rate, sweating, blood pressure and body temperature of the occupant detected by the sensor. Also, for example, the sensor information acquiring unit 208 acquires from a wearable device worn by the occupant, biological information such as heartbeat, pulse rate, sweating, blood pressure and body temperature of the occupant detected by the wearable device. Also, when the vehicle 100 includes the sensor for detecting the usage of the sun visor, the sensor information acquiring unit 208 may acquire the information indicating the usage of the sun visor detected by the sensor.

The driving situation acquiring unit 210 acquires the driving situation of the vehicle 100. For example, the driving situation acquiring unit 210 acquires, from the navigation system of the vehicle 100, the driving situation of the vehicle 100 managed by the navigation system. The navigation system of the vehicle 100 may determine the driving situation of the vehicle 100 based on the road data in the vicinity of the driving vehicle 100, the speed, acceleration, steering wheel's operational state, the brake's operational state of the vehicle 100, and the like.

The driving situation of the vehicle 100 may include the condition of the vehicle 100, the situation of the road on which the vehicle 100 drives, etc. For example, the condition of the vehicle 100 includes information about the driving speed of the vehicle 100. For example, the information about the driving speed of the vehicle 100 includes those indicating normal speed driving of the vehicle 100, acceleration of the vehicle 100, sudden acceleration of the vehicle 100, sudden stop of the vehicle 100, and the like.

The situation of the road on which the vehicle 100 drives includes, for example, the geometry of the road on which the vehicle 100 drives. Examples of the geometry of the road may include a straight road, a curved road, a sloping road, and the like. Curves may be categorized into a smooth curve, a normal curve, a sharp curve, and the like depending on the degree of the curvature. Slopes may be divided into an upslope and a downslope and may also be categorized into a moderate upslope, a normal upslope, a steep upslope, a moderate downslope, a normal downslope, a steep downslope, and the like depending on the degree of the slope.

The area information receiving unit 212 receives the lower accuracy area information. The area information receiving unit 212 may receive the lower accuracy area information from the information management server 300 through the network 10. The area information receiving unit 212 stores the lower accuracy area information, received from the information management server 300, in an area information storage unit 214. Each time the lower accuracy area information is updated in the information management server 300, the area information receiving unit 212 may receive the lower accuracy area information from the information management server 300, and may update the lower accuracy area information stored in the area information storage unit 214.

The determination unit 220 determines whether the vehicle 100 is located inside the lower accuracy area. The determination unit 220 may determine whether the vehicle 100 is located inside the lower accuracy area based on the position information indicating the current location of the vehicle 100 that is acquired by the position information acquiring unit 202 and the lower accuracy area information stored in the area information storage unit 214. Also, the determination unit 220 may determine whether the vehicle 100 is located inside the lower accuracy area by identifying the relative position of the vehicle 100 to the sun from the position information and the date-and-time information and identifying if there is a building or the like that blocks the sunlight in between the vehicle 100 and the sun. When the vehicle 100 has a dedicated function, such as a light sensor which detects the intensity of light reaching the occupant, to determine whether the sunlight reaches the occupant, the determination unit 220 may use the function to determine whether the vehicle 100 is located inside the lower accuracy area.

The emotion estimating unit 230 estimates the emotion of the occupant by performing an emotion estimation process. The emotion estimating unit 230 performs different emotion estimation processes depending on whether the vehicle 100 is located inside the lower accuracy area or not.

For example, the emotion estimating unit 230 performs the emotion estimation process using the image of the occupant when the vehicle 100 is not located inside the lower accuracy area, and performs the emotion estimation process using information about the occupant other than the image of the occupant when the vehicle 100 is located inside the lower accuracy area. The information about the occupant includes, for example, image, voice, heartbeat, pulse rate, sweating, blood pressure, body temperature, and the like of the occupant. The emotion estimating unit 230 may perform the emotion estimation process without using the image of the occupant when the vehicle 100 is located inside the lower accuracy area.

For example, the emotion estimating unit 230 performs the emotion estimation process using the image of the occupant when the vehicle 100 is not located inside the lower accuracy area, and performs the emotion estimation process using the voice of the occupant when the vehicle 100 is located inside the lower accuracy area. For example, when the sunlight reaches the occupant of the vehicle 100, the accuracy of the emotion estimation process using the image of the occupant may lower but the emotion estimation process using the voice of the occupant is not easily affected by the sunlight. Therefore, lowering in the estimation accuracy may be suppressed compared to when performing the emotion estimation process using the image of the occupant in the area where the sunlight reaches the occupant.

For example, the emotion estimating unit 230 performs the emotion estimation process based on a feature of the voice itself. Examples of features of a voice itself can include the volume, tone, spectrum, fundamental frequency, and the like of the voice. The emotion estimating unit 230 may perform the emotion estimation process based on a text string obtained from speech recognition on a voice. The emotion estimating unit 230 may also perform the emotion estimation process based on both of a feature of a voice itself and a text string obtained from speech recognition on the voice. If the vehicle 100 includes a plurality of microphones 122 for picking up respective voices of a plurality of occupants, the emotion estimating unit 230 may identify the speaker based on the difference between the microphones 122. If a single microphone 122 is used to pick up voices of a plurality of occupants, the emotion estimating unit 230 may identify the speaker by using a known speaker identification function. Examples of the known speaker identification function include a method using features of a voice, a method of determining from the direction of capturing the voice, and the like. There are various known techniques for estimating the emotion of a person from a voice of the person, and any of the various techniques may be adopted for the emotion estimating unit 230.

For example, the emotion estimating unit 230 performs the emotion estimation process using the image of the occupant when the vehicle 100 is not located inside the lower accuracy area, and performs the emotion estimation process using the heartbeat, pulse rate, sweating, blood pressure, body temperature, and the like of the occupant when the vehicle 100 is located inside the lower accuracy area. There are various known techniques for estimating the emotion of a person from the heartbeat, pulse rate, sweating, blood pressure, body temperature, and the like of the person, and any of the various techniques may be adopted for the emotion estimating unit 230.

The emotion estimating unit 230 stores the emotion estimated from the image of the occupant in association with the driving situation of the vehicle 100 when the vehicle 100 is not located inside the lower accuracy area, and may acquire the driving situation of the vehicle 100 when the vehicle 100 is located inside the lower accuracy area, and use the emotion stored in association with the acquired driving situation as an estimation result of the emotion of the occupant. For example, when the vehicle 100 is not located inside the lower accuracy area, acceleration is associated with excitement as the emotion of the driver 52 and with tension as the passenger emotion 54. Also, for example, a sharp curve is associated with tension as the emotion of the driver 52 and passenger 54. Also, for example, a traffic jam is associated with anger as the emotion of the driver 52 and the passenger 54. Moreover, when the vehicle 100 is located inside the lower accuracy area and if the driving situation acquiring unit 210 acquires acceleration as the driving situation of the vehicle 100, the emotion estimating unit 230 provides an estimation result indicating excitement for the emotion of the driver 52 and tension for the emotion of the passenger 54. The driver 52 who was excited when accelerating the vehicle 100 is likely to have the emotion of excitement when subsequently accelerating the vehicle 100. Also, the driver 52 who felt happy when accelerating the vehicle 100 is likely to have the emotion of happiness when subsequently accelerating the vehicle 100. The emotion estimating unit 230 of the present embodiment performs the emotion estimation process based on the driving situation of the vehicle 100 when the vehicle 100 is located inside the lower accuracy area, to enable the use of the feature of the occupant in the emotion estimation process, while preventing the image-based emotion estimation with low accuracy, so that the lowering of the estimation accuracy may be suppressed.

The emotion estimating unit 230 may perform the emotion estimation process using an image of the occupant and a voice of the occupant when the vehicle 100 is not located inside the lower accuracy area, and performs the emotion estimation process with decreased weighting when the vehicle 100 is located in the lower accuracy area, wherein the decreased weighting applies a smaller weight to the image of the occupant than in the emotion estimation process performed when the vehicle 100 is not located inside the lower accuracy area. For example, the emotion estimating unit 230 performs the emotion estimation process with weighting of five to the image and five to the voice when the vehicle 100 is not located inside the lower accuracy area, and performs the emotion estimation process with weighting of two to the image and eight to the voice when the vehicle 100 is located inside the lower accuracy area. This may enable normally estimating the emotion of the occupant using the image and voice, while reducing the impact of the lowering of the accuracy of image-based emotion estimation process in case it occurs.

When the vehicle 100 is located inside the lower accuracy area, the determination unit 220 may further determine an occupant for whom the estimation accuracy of the image-based emotion estimation process lowers and an occupant for whom the estimation accuracy of the image-based emotion estimation process does not lower. For example, the lower accuracy area information includes information indicating whether the estimation accuracy lowers for each of the driver's seat 162, front passenger seat 164 and backseat 166. For example, the lower accuracy area information of the lower accuracy area where intense sunlight reaches the driver's seat 162 and front passenger seat 164 but not the backseat includes information indicating that the occupants in the driver's seat 162 and front passenger seat 164 are occupants for whom the estimation accuracy lowers and the occupant of the backseat 166 is an occupant for whom the estimation accuracy does not lower.

When the vehicle 100 is located inside the lower accuracy area, the emotion estimating unit 230 may perform the emotion estimation process to estimate the emotion of an occupant for whom the estimation accuracy lowers, based on the emotion which is estimated using the image of the occupant for whom the estimation accuracy does not lower. For example, the emotion estimating unit 230 regards the emotion of the occupant for whom the estimation accuracy lowers to be the same as the emotion estimated using the image of the occupant for whom the estimation accuracy does not lower. A highly probable emotion estimation result may be derived since it is relatively highly possible that occupants in a limited space in the vehicle 100 have the same emotion.

In addition, for example, the emotion estimating unit 230 may store, in association with each other, the emotions of a plurality of occupants in the vehicle 100 estimated using their images when the vehicle 100 is not located inside the lower accuracy area, and estimate the emotion of an occupant for whom the estimation accuracy does not lower using an image of the occupant when the vehicle 100 is located inside the lower accuracy area, and use the estimated emotion as an estimation result for the emotion of an occupant for whom the estimation accuracy lowers. For example, when there is a tendency that the driver feels excited while the passenger feels tense, this enables deriving a highly probable emotion estimation result that reflects the tendency.

The emotion estimating unit 230 may post-estimate the emotion of the occupant. For example, the emotion estimating unit 230 estimates the emotion of the occupant to be expressed when the vehicle 100 is located inside the lower accuracy area using the emotion of the occupant estimated before the vehicle 100 enters the lower accuracy area and that after the vehicle 100 leaves the lower accuracy area. The emotion estimating unit 230 may estimate the emotion of the occupant by complementing the emotion of the occupant to be expressed when the vehicle 100 is located inside the lower accuracy area by the emotion of the occupant estimated before the vehicle 100 enters the lower accuracy area and the emotion of the occupant estimated after the vehicle 100 leaves the lower accuracy area. For example, when the emotion of the occupant estimated before entering the lower accuracy area indicates a low degree of happiness and the emotion of the occupant estimated after leaving the lower accuracy area indicates a high degree of happiness, the emotion estimating unit 230 determines a medium degree of happiness as an estimation result of the emotion of the occupant inside the lower accuracy area. In this manner, a highly probable emotion estimation result may be derived.

The event determination unit 232 determines whether a preset event occurs in the vehicle 100. The event determination unit 232 may determine whether the preset event occurs while the vehicle 100 is driving inside the lower accuracy area.

The preset event may be an event that changes the emotion of the occupant by the occurrence of the event. Examples of the event are playing music in the vehicle 100, performing certain driving operations such as sudden acceleration and sudden braking, and the like. Any event can be set as long as the event may change the emotion of the occupant.

When the event determination unit 232 determines that the preset event has not occurred while the vehicle 100 is driving inside the lower accuracy area, the emotion estimating unit 230 may estimate the emotion of the occupant to be expressed when the vehicle 100 is located inside the lower accuracy area using the emotion of the occupant estimated before the vehicle 100 enters the lower accuracy area and that after the vehicle 100 leaves the lower accuracy area. When the event determination unit 232 determines that the preset event occurs while the vehicle 100 is driving inside the lower accuracy area, the emotion estimating unit 230 does not complement the emotion of the occupant by the emotion of the occupant estimated before the vehicle 100 enters the lower accuracy area and that after the vehicle 100 leaves the lower accuracy area. The occupant is likely to have a special emotion when the above-mentioned event occurs while the vehicle 100 is driving inside the lower accuracy area, and it is relatively highly possible that the emotion of the occupant estimated by complementing it by the emotion estimated before entering the lower accuracy area and that after leaving the lower accuracy area does not agree with the actual emotion. In this situation, lowering in the estimation accuracy may be prevented by not performing the complement.

The speech inducing process executing unit 242 executes a speech inducing process to induce the occupant to produce a speech. For example, the speech inducing process executing unit 242 executes a speech inducing process when the vehicle 100 is located inside the lower accuracy area and the emotion estimating unit 230 estimates the emotion of the occupant using the voice of the occupant. This can prevent the situation of the emotion estimating unit 230 not being able to execute the emotion estimation process using the voice of the occupant due to not being able to acquire the voice of the occupant.

For example, the speech inducing process executing unit 242 uses an audio speaker 124 to output a sound to the occupant as the speech inducing process. The speech inducing process executing unit 242 may output a pre-stored sound. The content of the sound may be a question to the occupant to cause the occupant to produce a speech by answering the question. Also, the content of the sound may be a request to the occupant to produce a speech. The content of the sound may be determined arbitrarily. When there is an agent communicating with the occupant in a navigation system of the vehicle 100, the speech inducing process executing unit 242 may make the agent talk to the occupant.

The request process executing unit 244 executes a request process to request the input of the emotion of the occupant. The input emotion acquiring unit 246 acquires the emotion of the occupant input in response to the request process performed by the request process executing unit 244.

For example, the request process executing unit 244 executes the request process when the vehicle 100 is located inside the lower accuracy area. The emotion estimating unit 230 may provide the emotion of the occupant acquired by the input emotion acquiring unit 246 as an estimation result of the emotion of the occupant when the vehicle 100 is located inside the lower accuracy area. The lowering of the estimation accuracy may be suppressed by enabling to receive the input of the emotion of the occupant instead of using the image inside the lower accuracy area.

For example, the request process executing unit 244 displays an input screen to input the emotion of the occupant on the display 130, as a request process. The input emotion acquiring unit 246 acquires the emotion input in the input screen displayed on the display 130. For example, the request process executing unit 244 displays a plurality of selectable emotions on the display 130. The input emotion acquiring unit 246 acquires the emotion selected from the plurality of emotions displayed on the display 130. The emotion of an occupant may be input by the occupant himself/herself or also by another occupant.

For example, the request process executing unit 244 causes the audio speaker 124 to output a sound requesting a vocal input of the emotion of the occupant, as the request process. The input emotion acquiring unit 246 acquires the emotion pronounced by the occupant in response to the sound via the microphone 122.

The weather information acquiring unit 248 acquires weather information indicating the weather at the location of the vehicle 100. For example, the weather information acquiring unit 248 receives the weather information from the weather information server 400 via the network 10. If the vehicle 100 includes a weather sensor, the weather information acquiring unit 248 may receive the weather information from the weather sensor.

When the determination unit 220 determines that the vehicle 100 is located inside the lower accuracy area but the vehicle 100 is in a situation that the accuracy of the emotion estimation process using the image of the occupant does not lower, the emotion estimating unit 230 may perform the same emotion estimation process as if the vehicle 100 was located outside the lower accuracy area. For example, when the determination unit 220 determines that the vehicle 100 is located inside the sunlight reaching area but is in a situation that the sunlight does not reach the occupant, the emotion estimating unit 230 performs the same emotion estimation process as if the vehicle 100 was located outside the sunlight reaching area.

For example, when the weather indicated by the weather information acquired by the weather information acquiring unit 248 is not sunny, the emotion estimating unit 230 determines that the occupant is in a situation that the sunlight does not reach. Also, for example, when the sensor information acquiring unit 208 acquires information showing the usage of the sun visor from the sensor that detects the use of the sun visor, the emotion estimating unit 230 determines that it is in a situation that the sunlight does not reach the occupant.

Figure 4:
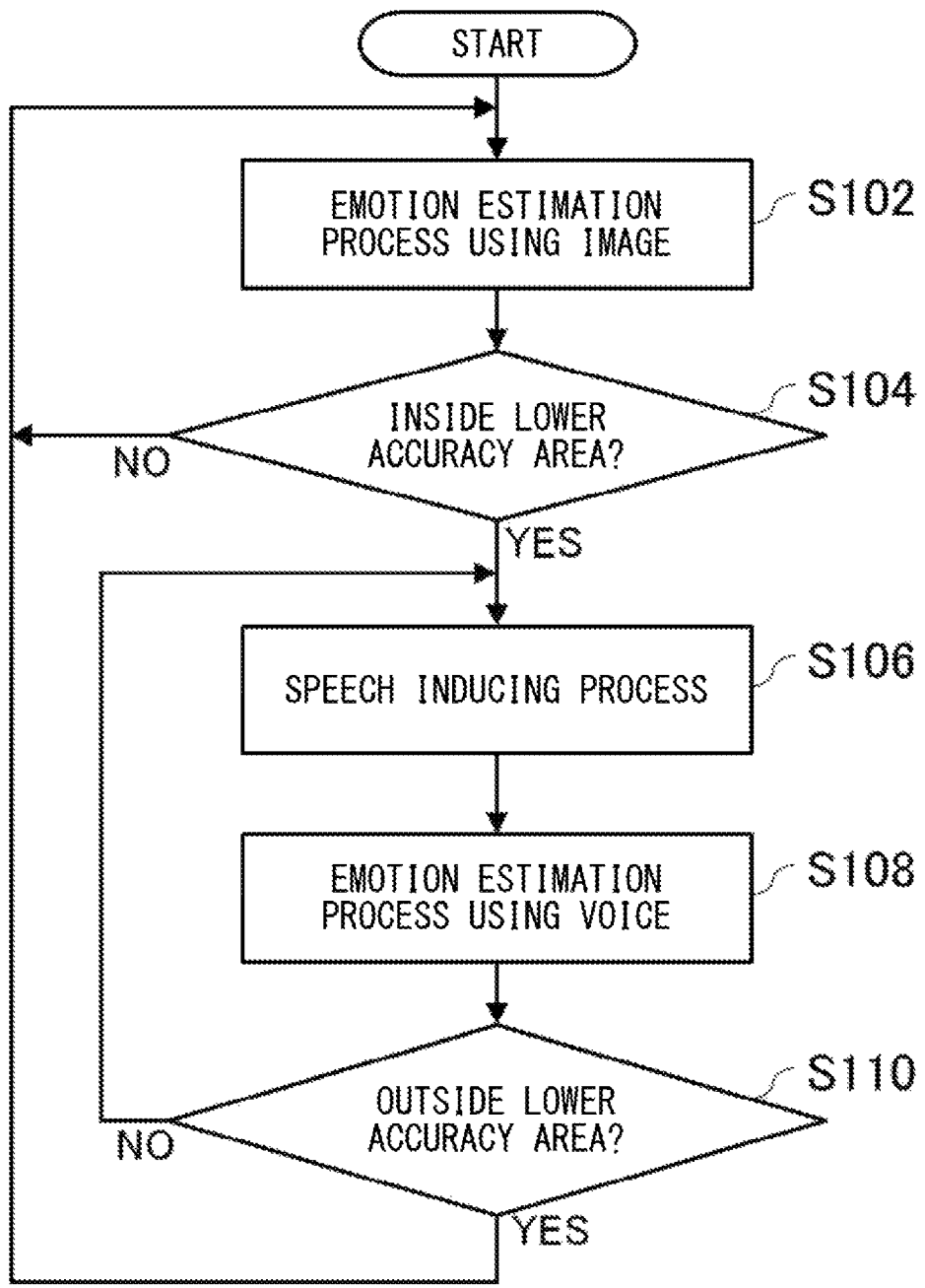
FIG. 4 schematically shows an example of a process flow of the information processing apparatus 200.

FIG. 4 schematically shows an example of a process flow of the information processing apparatus 200. Here, it is assumed that the emotion estimation process is started outside the lower accuracy area.

In Step (Step may be abbreviated as S) 102, the emotion estimating unit 230 performs the emotion estimation process using the image of the occupant acquired by the image acquiring unit 204. In S 104, the determination unit 220 determines whether the vehicle 100 is located inside the lower accuracy area. If determined to be located inside the lower accuracy area, the process proceeds to S 106, and if determined not to be located inside the lower accuracy area, the process returns to S 102.

In S 106, the speech inducing process executing unit 242 executes the speech inducing process. In S 108, the emotion estimating unit 230 performs the emotion estimation process using the voice of the occupant acquired by the voice acquiring unit 206. In S 110, the determination unit 220 determines whether the vehicle 100 is located outside the lower accuracy area. If determined not to be located outside the lower accuracy area, the process returns to S 106, and if determined to be located outside the lower accuracy area, the process returns to S 102.

The process shown in FIG. 4 may be continued until the emotion estimation process is stopped. For example, the information processing apparatus 200 ends the process shown in FIG. 4, such as when instructed from the occupant to stop the emotion estimation process, when the engine of the vehicle 100 is stopped, when the vehicle 100 is powered off, etc.

Figure 5:
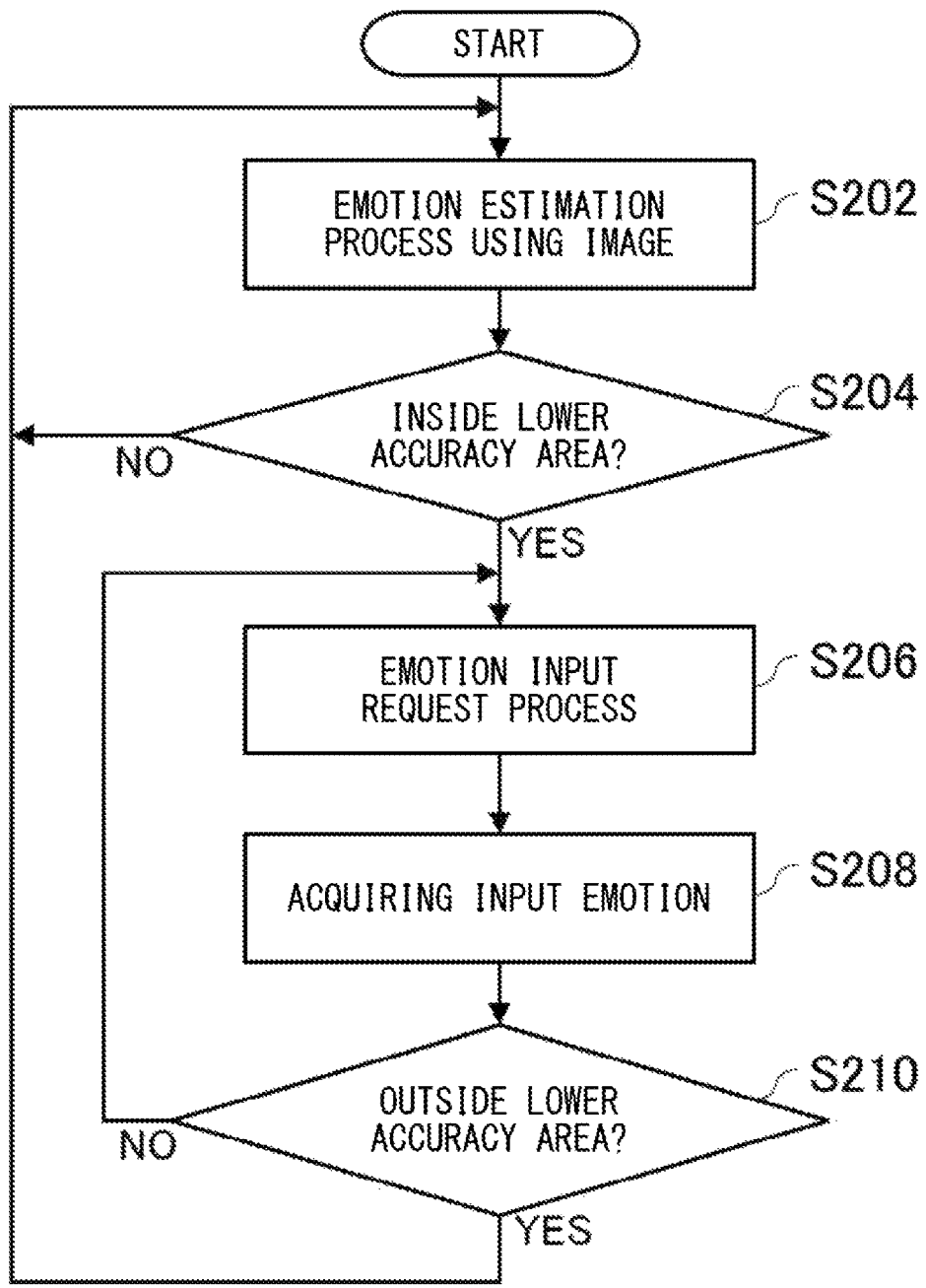
FIG. 5 schematically shows an example of a process flow of the information processing apparatus 200.

FIG. 5 schematically shows an example of a process flow of the information processing apparatus 200. Here, it is assumed that the emotion estimation process is started outside the lower accuracy area.

In S 202, the emotion estimating unit 230 performs the emotion estimation process using the image of the occupant acquired by the image acquiring unit 204. In S 204, the determination unit 220 determines whether the vehicle 100 is located inside the lower accuracy area. If determined to be located inside the lower accuracy area, the process proceeds to S 206, and if determined not to be located inside the lower accuracy area, the process returns to S 202.

In S 206, the request process executing unit 244 executes the emotion input request process to request the input of the emotion of the occupant. In S 208, the input emotion acquiring unit 246 acquires the emotion which was input by the occupant in response to the request process in S 206. The emotion estimating unit 230 provides the emotion, acquired by the input emotion acquiring unit 246, as an estimation result of the emotion of the occupant.

In S 210, the determination unit 220 determines whether the vehicle 100 is located outside the lower accuracy area. If determined not to be located outside the low accuracy area, the process returns to S 206, and if determined to be located outside the low accuracy area, the process returns to S 202.

The process shown in FIG. 5 may be continued until the emotion estimation process is stopped. For example, the information processing apparatus 200 ends the process shown in FIG. 5, such as when instructed by the occupant to stop the emotion estimation process, when the engine of the vehicle 100 is stopped, when the vehicle 100 is powered off, etc.

Figure 6:
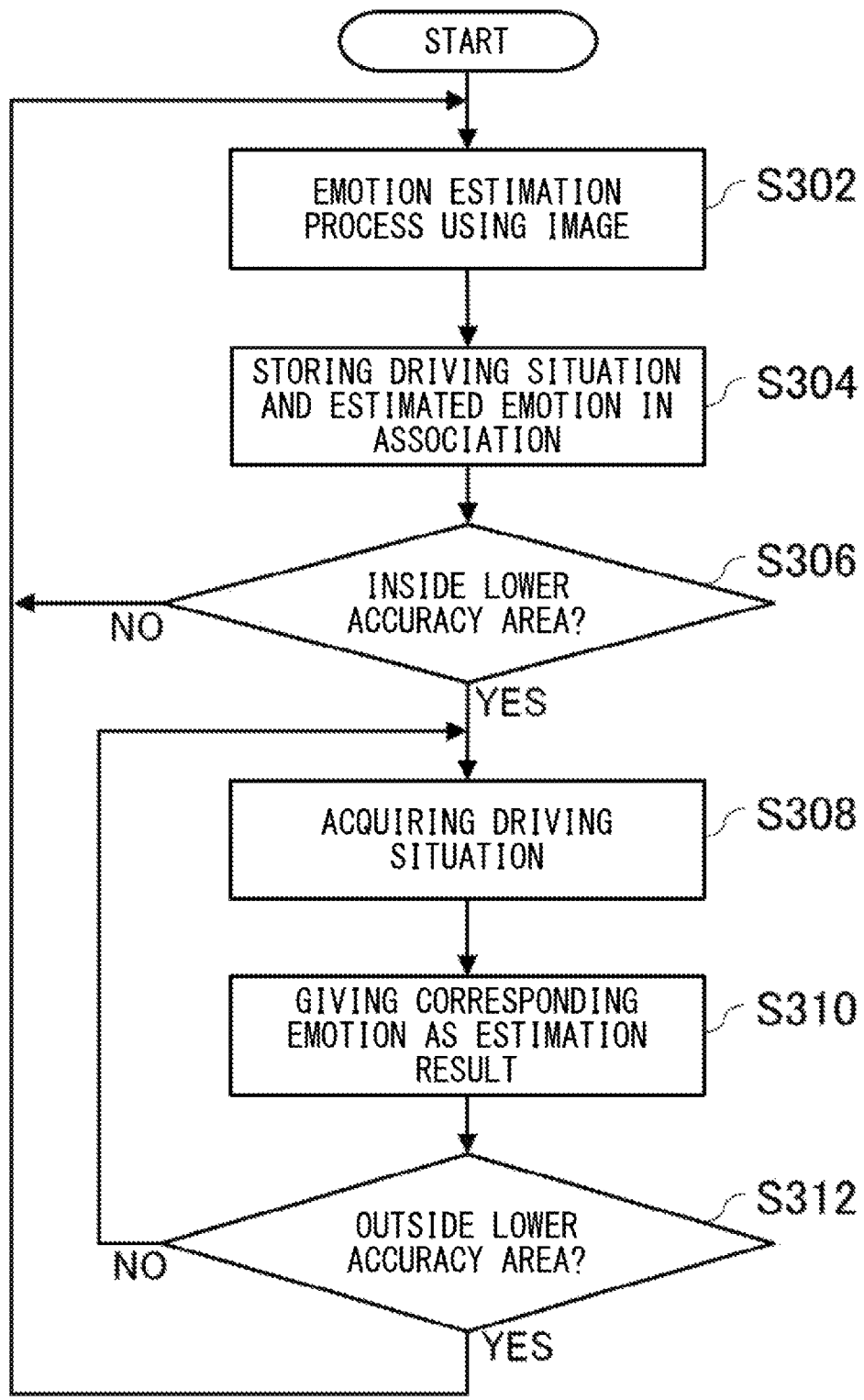
FIG. 6 schematically shows an example of a process flow of the information processing apparatus 200.

FIG. 6 schematically shows an example of a process flow of the information processing apparatus 200. Here, it is assumed that the emotion estimation process is started outside the lower accuracy area.

In S 302, the emotion estimating unit 230 performs the emotion estimation process using the image of the occupant acquired by the image acquiring unit 204. In S 304, the emotion estimating unit 230 stores the emotion of the occupant estimated in S 302 in association with the driving situation of the vehicle 100 that is acquired by the driving situation acquiring unit 210. In S 306, the determination unit 220 determines whether the vehicle 100 is located inside the lower accuracy area. If determined to be located inside the lower accuracy area, the process proceeds to S 308, and if determined not to be located inside the lower accuracy area, the process returns to S 302.

In S 308, the driving situation acquiring unit 210 acquires the driving situation of the vehicle 100. In S 310, the emotion estimating unit 230 provides the emotion, stored in association with the driving situation acquired by the driving situation acquiring unit 210 in S 308, as an estimation result of the emotion of the occupant. In S 312, the determination unit 220 determines whether the vehicle 100 is located outside the lower accuracy area. If determined not to be located outside the lower accuracy area, the process returns to S 308, and if determined to be located outside the lower accuracy area, the process returns to S 302.

The process shown in FIG. 6 may be continued until the emotion estimation process is stopped. For example, the information processing apparatus 200 ends the process shown in FIG. 6, such as when instructed from the occupant to stop the emotion estimation process, when the engine of the vehicle 100 is stopped, when the vehicle 100 is powered off, etc.

Figure 7:
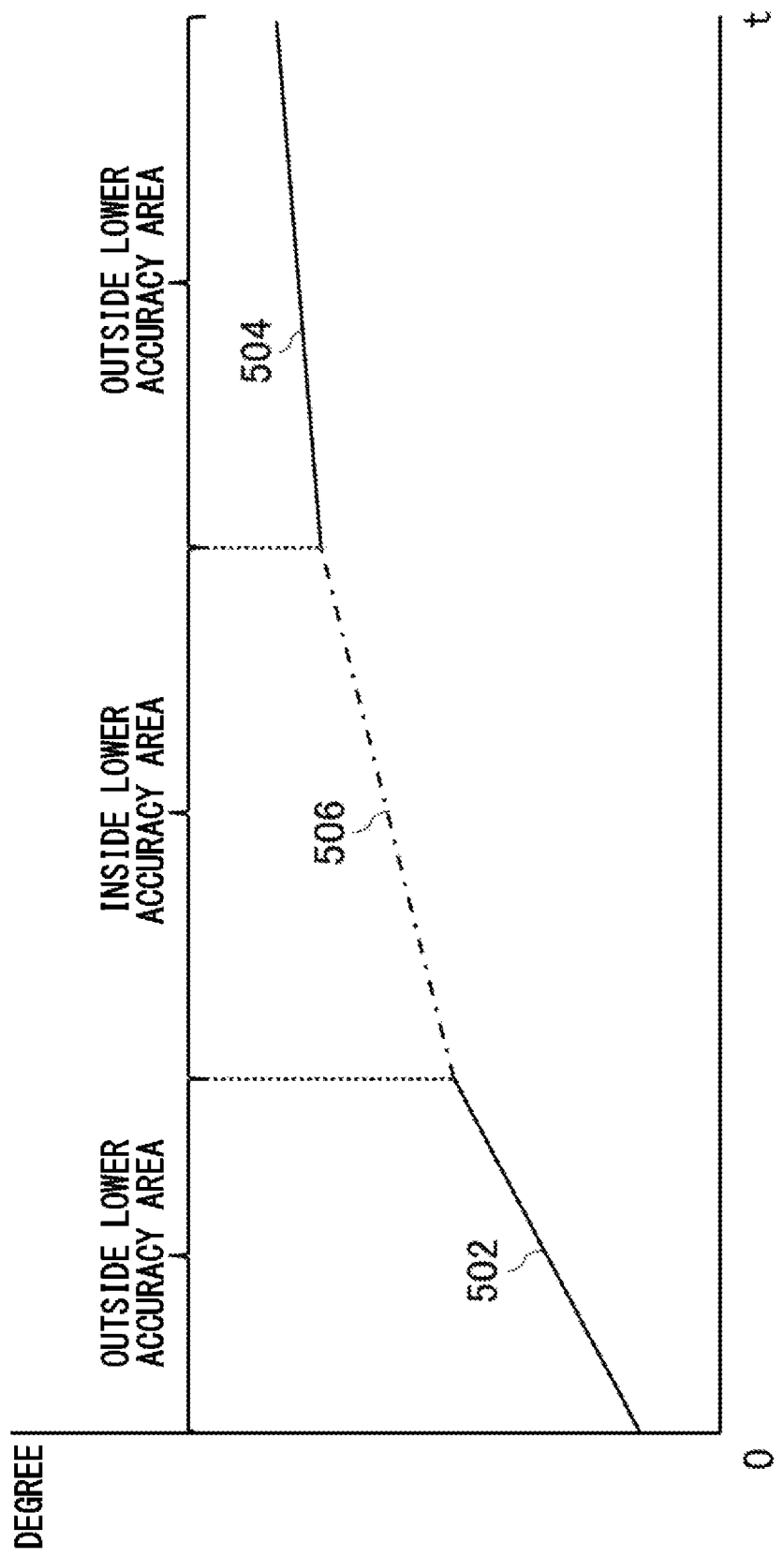
FIG. 7 schematically shows an example of an emotion 506 generated by a complement process.

FIG. 7 schematically shows an example of an emotion 506 estimated by a complement process. The emotion estimating unit 230 generates the emotion 506 based on the emotion of the occupant estimated before the vehicle 100 enters the lower accuracy area 502 and the emotion of the occupant estimated after the vehicle 100 leaves the lower accuracy area 504.

As shown in FIG. 7, when the degree of a certain emotion increases before the vehicle 100 enters the lower accuracy area and further increases after the vehicle 100 leaves the lower accuracy area, the emotion estimating unit 230 may generate the emotion 506 by connecting between the emotion 502 and the emotion 504.

Figure 8:
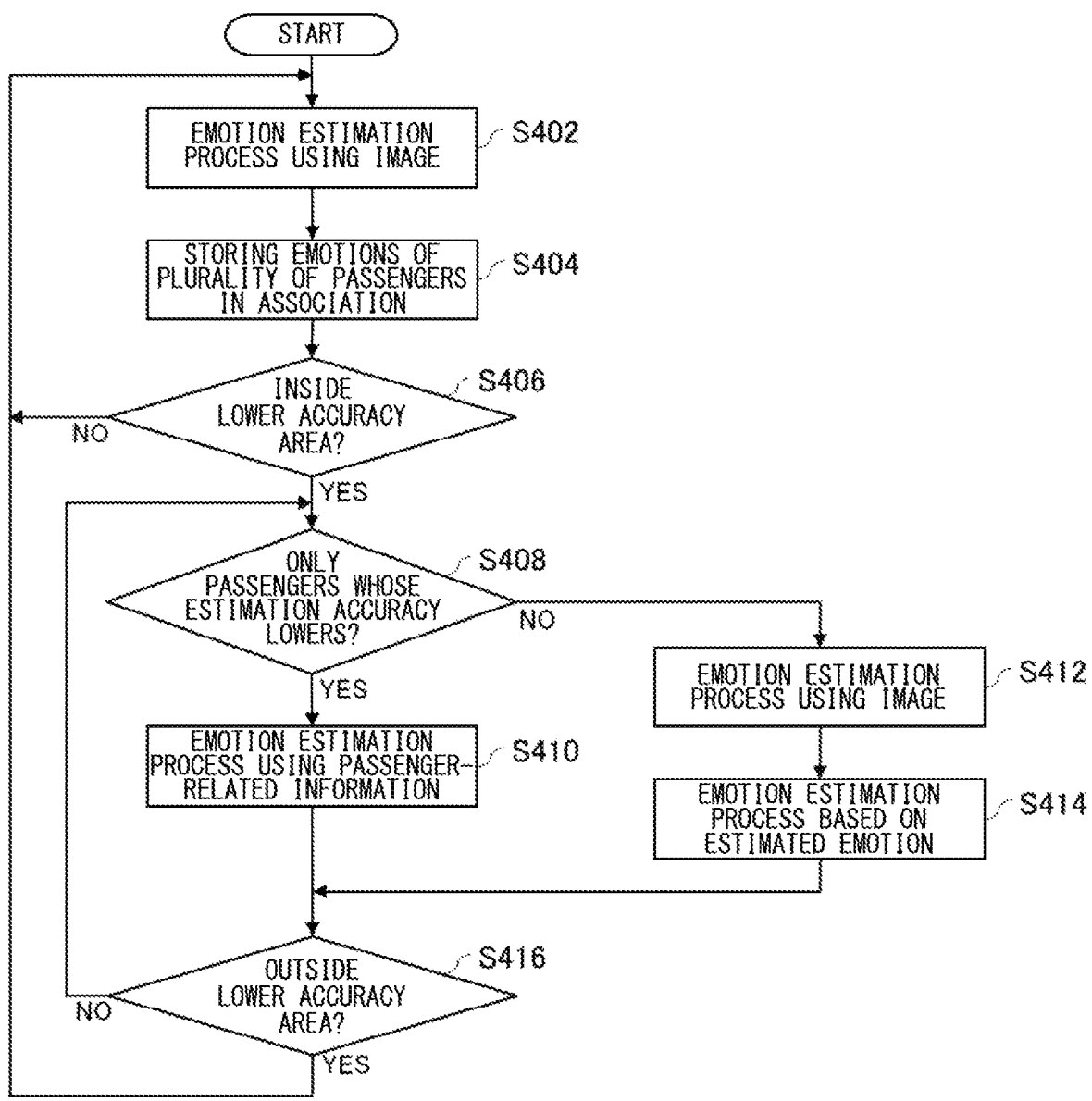
FIG. 8 schematically shows an example of a process flow of the information processing apparatus 200.

FIG. 8 schematically shows an example of a process flow of the information processing apparatus 200. Here, it is assumed that the emotion estimation process is started outside the lower accuracy area.

In S 402, the emotion estimating unit 230 performs the emotion estimation process using the image of the occupant acquired by the image acquiring unit 204. In S 304, the emotion estimating unit 230 stores the emotions of the plurality of occupants estimated in S 302 in association with each other. In S 406, the determination unit 220 determines whether the vehicle 100 is located inside the lower accuracy area. If determined to be located inside the lower accuracy area, the process proceeds to S 408, and if determined not to be located inside the lower accuracy area, the process returns to S 402.

In step 408, the emotion estimating unit 230 determines whether the occupants of the vehicle 100 are only those for whom the accuracy of the emotion estimation process lowers. If determined to be only the occupants for whom the estimation accuracy lowers, the process proceeds to S 410, and if determined not to be only those for whom the estimation accuracy lowers, the process proceeds to S 412.

In S 410, the emotion estimating unit 230 performs the emotion estimation process using information about the occupant other than the image of an occupant. In S 412, the emotion estimating unit 230 performs the emotion estimation process using the image of the occupant to the occupant for whom the estimation accuracy does not lower. In S 414, the emotion estimating unit 230 performs the emotion estimation process based on the estimated emotion S 412 for an occupant for whom the estimation accuracy lowers. The emotion estimating unit 230 may provide the emotion of the occupant, for whom the estimation accuracy lowers, which emotion is stored in association with the emotion of the occupant, for whom the estimation accuracy does not lower, and is estimated in S 412, as an estimation result of the emotion of the occupant for whom the estimation accuracy lowers.

In S 416, the determination unit 220 determines whether the vehicle 100 is located outside the lower accuracy area. If determined not to be located outside the lower accuracy area, the process returns to S 408, and if determined to be located outside the lower accuracy area, the process returns to S 402.

The process shown in FIG. 8 may be continued until the emotion estimation process is stopped. For example, the information processing apparatus 200 ends the process shown in FIG. 8, such as when instructed from the occupant to stop the emotion estimation process, when the engine of the vehicle 100 is stopped, when the vehicle 100 is powered off, etc.

Figure 9:
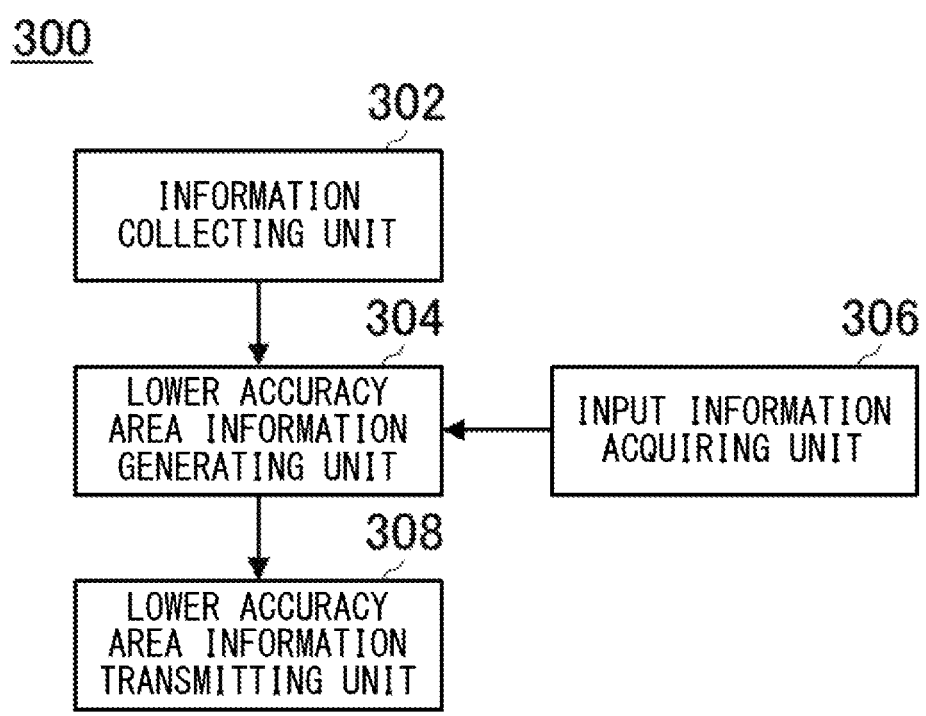
FIG. 9 schematically shows an example of functional configuration of an information management server 300.

FIG. 9 schematically shows an example of functional configuration of the information management server 300. The information management server 300 includes an information collecting unit 302, a lower accuracy area information generating unit 304, an input information acquiring unit 306 and a lower accuracy area information transmitting unit 308.

The information collecting unit 302 collects various types of information from a plurality of vehicles 100. For example, the information collecting unit 302 receives the position information and the date-and-time information, indicating the position and the date and time at which the sunlight reaches the occupant, from the vehicle 100. For example, the information collecting unit 302 receives the accuracy of the emotion estimation process using the face image of the occupant and the position information and the date-and-time information from the vehicle 100.

The lower accuracy area information generating unit 304 generates lower accuracy area information. For example, the lower accuracy area information generating unit 304 generates the lower accuracy area information, indicating the position of the lower accuracy area for each time period based on a three-dimensional map illustrating roads, buildings, and the like for each location and the position of the sun for each date and time. In addition, for example, the lower accuracy area information generating unit 304 generates the lower accuracy area information using the information collected by the information collecting unit 302. The lower accuracy area information generating unit 304 may generate the lower accuracy area information indicating the position of the lower accuracy area for each time period using a plurality of pieces of position information and date-and-time information indicating the position and the date and time at which the sunlight reaches the occupant. Also, the lower accuracy area information generating unit 304 may generate the lower accuracy area information indicating the position of the lower accuracy area for each time period using a plurality of estimation accuracies of the emotion estimation process using the face image of the occupant and a plurality of pieces of position information and date-and-time information.

The input information acquiring unit 306 acquires information which is input by an operator and the like of the information management server 300. For example, the operator inputs the information indicating the position of the lower accuracy area for each time period. The lower accuracy area information generating unit 304 may generate lower accuracy area information using the information acquired by the input information acquiring unit 306.

The lower accuracy area information transmitting unit 308 transmits the lower accuracy area information generated by the lower accuracy area information generating unit 304. The lower accuracy area information transmitting unit 308 may transmit the lower accuracy area information to the information processing apparatus 200 which is provided in each of the plurality of vehicles 100.

Figure 10:
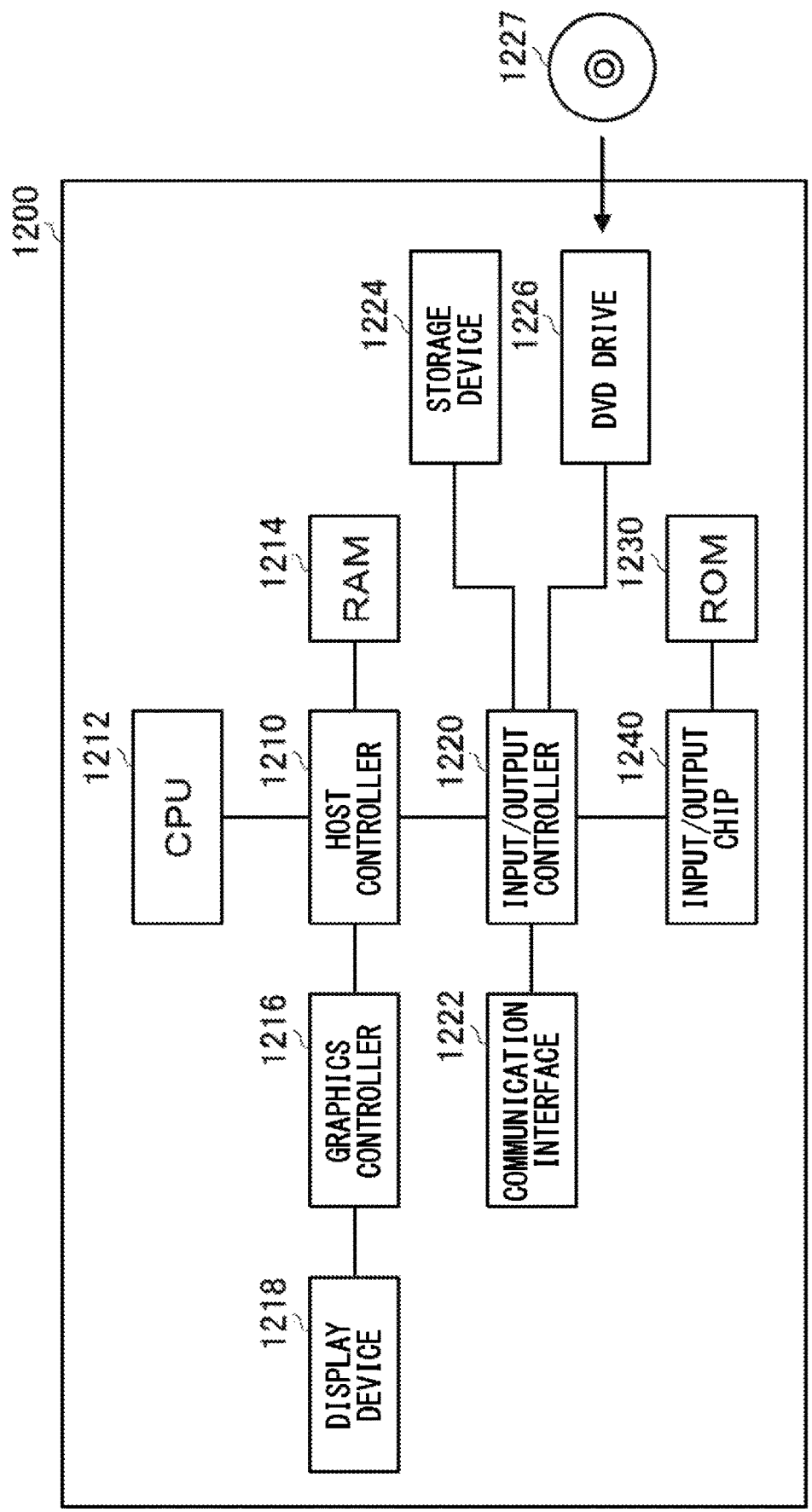
FIG. 10 schematically shows an example of hardware configuration of a computer 1200 that functions as the information processing apparatus 200.

FIG. 10 schematically shows an example of hardware configuration of a computer 1200 that functions as the information processing apparatus 200. A program that is installed in the computer 1200 can cause the computer 1200 to function as one or more units of apparatuses of the above embodiments or perform operations associated with the apparatuses of the above embodiments or the one or more units, and/or cause the computer 1200 to perform processes of the above embodiments or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, and a graphics controller 1216, which are mutually connected by a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be DVD-ROM drive, DVD-RAM drive, etc. The storage 1224 may be a hard disk, a solid-state drive, etc. The computer 1200 also includes legacy input/output units such as a ROM 1230 and a touch panel, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 within the computer 1200. The DVD drive 1226 reads the programs or the data from the DVD-ROM 1227 or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

A program is provided by computer readable storage media such as the DVD-ROM 1227 or the IC card. The program is read from the computer readable storage media, installed into the storage device 1224, RAM 1214, or ROM 1230, which are also examples of computer readable storage media, and executed by the CPU 1212. The information process described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication process to the communication interface 1222, based on the process described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of process on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable storage media on or near the computer 1200. In addition, a recording medium such as a hard disk or a RAM provided in a server system connected to a dedicated communication network or the Internet can be used as the computer readable storage media, thereby providing the program to the computer 1200 via the network.

Blocks in flowcharts and block diagrams in the above embodiments may represent steps of processes in which operations are performed or units of apparatuses responsible for performing operations. Certain steps and units may be implemented by dedicated circuit, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer-readable storage media may include any tangible device that can store instructions for execution by a suitable device, such that the computer-readable storage medium having instructions stored therein comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: network; 52: driver; 54: passenger; 100: vehicle; 110: camera; 112: angle of view, 122: microphone; 124: audio speaker, 130: display; 142: wireless communication antenna; 144: GPS antenna; 150: steering wheel; 162: driver's seat; 164: front passenger seat; 166: backseat; 200: information processing apparatus; 202: position information acquiring unit; 204: image acquiring unit; 206: voice acquiring unit; 208: sensor information acquiring unit; 210: driving situation acquiring unit; 212: area information receiving unit; 214: area information storage unit; 220: determination unit; 230: emotion estimating unit; 232: event determination unit; 242: speech inducing process executing unit; 244: request process executing unit; 246: input emotion acquiring unit; 248: weather information acquiring unit; 300: information management server; 302: information collecting unit; 304: lower accuracy area information generating unit; 306: input information acquiring unit; 308: lower accuracy area information transmitting unit; 400: weather information server; 502, 504, 506: emotion; 1200: computer; 1210: host controller; 1212: CPU; 1214: RAM; 1216: graphics controller; 1218: display device; 1220: input/output controller; 1222: communication interface; 1224: storage device; 1226: DVD drive; 1227: DVD-ROM; 1230: ROM; 1240: input/output chip

What is claimed is:
1. An information processing apparatus comprising:
a determination unit configured to determine whether a vehicle is located inside a lower accuracy area, in which an estimation accuracy of an emotion estimation process lowers, wherein the emotion estimation process is a process for estimating an emotion of an occupant of the vehicle based on an image of the occupant captured by an image-capturing unit provided in the vehicle; and an emotion estimating unit configured to estimate the emotion of the occupant by performing different emotion estimation processes depending on whether the vehicle is located inside the lower accuracy area or not, wherein the vehicle is located inside the lower accuracy area under a condition that sunlight or shadows interfere with the image of the occupant.

2. The information processing apparatus according to claim 1, wherein the emotion estimating unit performs an emotion estimation process using the image of the occupant when the vehicle is not located inside the lower accuracy area, and performs an emotion estimation process using information about the occupant other than the image of the occupant when the vehicle is located inside the lower accuracy area.

3. The information processing apparatus according to claim 2, wherein the emotion estimating unit performs an emotion estimation process without using the image of the occupant when the vehicle is located inside the lower accuracy area.

4. The information processing apparatus according to claim 2, wherein the emotion estimating unit performs an emotion estimation process using a voice of the occupant when the vehicle is located inside the lower accuracy area.

5. The information processing apparatus according to claim 4, comprising a speech inducing process executing unit configured to perform a speech inducing process by inducing the occupant to produce a speech when the vehicle is located inside the lower accuracy area.

6. The information processing apparatus according to claim 2, comprising:
a request process executing unit configured to perform a request process to request an input of an emotion of the occupant when the vehicle is located inside the lower accuracy area; and
an input emotion acquiring unit configured to acquire the emotion of the occupant input in response to the request process, wherein the emotion estimating unit provides the emotion of the occupant acquired by the input emotion acquiring unit as an estimation result of the emotion of the occupant.

7. The information processing apparatus according to claim 2, wherein the emotion estimating unit stores an emotion estimated from the image of the occupant in association with a driving situation of the vehicle when the vehicle is not located inside the lower accuracy area, acquires the driving situation of the vehicle when the vehicle is located inside the lower accuracy area, and provides the emotion stored in association with the acquired driving situation as an estimation result of the emotion of the occupant.

8. The information processing apparatus according to claim 1, wherein the emotion estimating unit estimates an emotion of the occupant to be expressed when the vehicle is located inside the lower accuracy area based on an emotion of the occupant estimated before the vehicle enters the lower accuracy area and an emotion of the occupant estimated after the vehicle leaves the lower accuracy area.

9. The information processing apparatus according to claim 8, comprising:
an event determination unit configured to determine whether a preset event occurs while the vehicle drives inside the lower accuracy area, wherein when it is determined that the preset event does not occur while the vehicle drives inside the lower accuracy area, the emotion estimating unit estimates an emotion of the occupant of the vehicle located inside the lower accuracy area based on an emotion of the occupant estimated before the vehicle enters the lower accuracy area and an emotion of the occupant estimated after the vehicle leaves the lower accuracy area.

10. The information processing apparatus according to claim 1, wherein the emotion estimating unit performs an emotion estimation process using the image of the occupant and a voice of the occupant when the vehicle is not located inside the lower accuracy area, and performs an emotion estimation process with decreased weighting when the vehicle is located inside the lower accuracy area, wherein the decreased weighting applies a smaller weight to the image of the occupant than in the emotion estimation process performed when the vehicle is not located inside the lower accuracy area.

11. The information processing apparatus according to claim 10, comprising a speech inducing process executing unit configured to perform a speech inducing process to induce the occupant to produce a speech, when the vehicle is located inside the lower accuracy area.

12. The information processing apparatus according to claim 1, wherein the determination unit further determines an occupant for whom an estimation accuracy of an image-based emotion estimation process lowers and an occupant for whom the estimation accuracy of the image-based emotion estimation process does not lower among a plurality of occupants of the vehicle when the vehicle is located inside the lower accuracy area, and
the emotion estimating unit performs an emotion estimation process to estimate the emotion of the occupant for whom the estimation accuracy lowers based on an emotion estimated using the image of the occupant for whom the estimation accuracy does not lower when the vehicle is located inside the lower accuracy area.

13. The information processing apparatus according to claim 12, wherein the emotion estimating unit stores, in association with each other, the emotions of a plurality of occupants of the vehicle estimated using images of the plurality of occupants when the vehicle is not located inside the lower accuracy area, estimates the emotion of the occupant for whom the estimation accuracy does not lower using the image of the occupant when the vehicle is located inside the lower accuracy area, and provides an emotion of the occupant for whom the estimation accuracy lowers which is stored in association with the estimated emotion of the occupant for whom the estimation accuracy does not lower as an estimation result of the emotion of the occupant for whom the estimation accuracy lowers.

14. A non-transitory computer readable storage medium having stored thereon a program for causing a computer to serve as:
a determination unit configured to determine, whether a vehicle is located inside a lower accuracy area, in which an estimation accuracy of an emotion estimation process lowers, wherein the emotion estimation process is a process for estimating an emotion of an occupant based on an image of the occupant of the vehicle captured by an image-capturing unit provided in the vehicle; and
an emotion estimating unit configured to estimate the emotion of the occupant by performing different emotion estimation processes depending on whether the vehicle is located inside the lower accuracy area or not, wherein the vehicle is located inside the lower accuracy area under a condition that sunlight or shadows interfere with the image of the occupant.

15. An information processing apparatus comprising:
a determination unit configured to determine whether a vehicle is located inside a lower accuracy area, in which an estimation accuracy of an emotion estimation process lowers, wherein the emotion estimation process is a process for estimating an emotion of an occupant of the vehicle based on an image of the occupant captured by an image-capturing unit provided in the vehicle; and
an emotion estimating unit configured to estimate the emotion of the occupant by performing different emotion estimation processes depending on whether the vehicle is located inside the lower accuracy area or not, and estimates the emotion of the occupant based on the emotion of the occupant while inside the lower accuracy area and the emotion of the occupant while outside the lower accuracy area.

* * * * *